United States Patent [19]
Specht

[11] 3,952,860
[45] Apr. 27, 1976

[54] PLASTIC LINK FOR CONVEYOR CHAIN HAVING OPTIMAL THREE DIMENSIONAL MOBILITY

[75] Inventor: Dieter Specht, Dhunn, Germany

[73] Assignee: Interroll Fordertechnik GmbH & Co. KG, Dhunn, Germany

[22] Filed: July 30, 1974

[21] Appl. No.: 493,058

[30] Foreign Application Priority Data
  Aug. 4, 1973  Germany............................ 2339644
  June 28, 1974  Germany............................ 2431266

[52] U.S. Cl................................ 198/189; 198/195; 74/250 C
[51] Int. Cl.² ........................................ B65G 17/00
[58] Field of Search .......... 198/189, 195, 108, 168, 198/177 R, DIG. 7; 74/245 P, 250 C, 245 C

[56] References Cited
UNITED STATES PATENTS

| | | | |
|---|---|---|---|
| 2,153,098 | 4/1939 | Pellar | 198/189 |
| 3,006,456 | 10/1961 | Ferris et al. | 198/177 R |
| 3,049,217 | 8/1962 | Parker et al. | 198/177 R |
| 3,243,035 | 3/1966 | Ratkowski | 198/195 X |
| 3,768,631 | 10/1973 | Wahren | 198/189 |

*Primary Examiner*—Robert J. Spar
*Assistant Examiner*—James M. Slattery
*Attorney, Agent, or Firm*—Anthony J. Casella

[57] ABSTRACT

A link to be assembled to other similar links to form a chain, such as is used with conveyors, capable of movement in three mutually perpendicular directions comprises a one-piece plastic member of generally U-shaped configuration including a cross piece and two opposed arms. Apertured hubs are formed unitary with the ends of each arm, as well as at the cross piece. A first swivel axle interconnects the cross piece portion of the link to the free arms of the adjacent link, while a second swivel axle interconnects the hubs disposed at the free ends of the link to the cross piece of a third link. The first and second pivot axles are disposed orthogonal to one another thereby providing optimal three dimensional mobility to the chain. Supplemental parts such as lattice plates, solid plates, etc., are secured to the link at the hubs unitary with the arms of the link.

17 Claims, 40 Drawing Figures

PLASTIC LINK FOR CONVEYOR CHAIN HAVING OPTIMAL THREE DIMENSIONAL MOBILITY

The invention relates to a chain link which can be assembled with other similar links to form a chain such as is used with conveyors.

According to the invention there is provided a link which can be assembled with other similar links to form a chain, comprising a one-piece plastics material member having first means constituting or to receive a swivel axle; second means to receive the swivel axle of a similar link thereby to secure the two links together in pivotable relationship; third means for engagement with a sprocket wheel; and fourth means for the attachment of supplementary parts (as herein defined).

Throughout this specification the expression "supplementary parts" is used to denote parts which when attached to a chain composed of links according to the invention give the chain a conveying ability, such supplementary parts including lattice plates, solid plates, driving plates, bar or axle holders, and buckets as will be described hereinafter.

A chain composed of links according to the invention is capable of easy assembly and of being adaptable to the particular application at any given time, and yet forms a complete, robust chain with a long life in all the many uses to which it may be put. In the event of damage to a link of the chain it is possible to replace this link from a spare part store which need hold relatively few different replacement parts, without the need for any special skill or expert knowledge. In addition, the chain can be capable of optimal movement in all directions in space, i.e. not only perpendicular to the main plane of each link but also in the plane containing this main plane itself, that is to say the chain can have optimal three-dimensional mobility.

The invention will now be described by way of example with reference to the diagrammatic drawings, in which.

Figure 38:
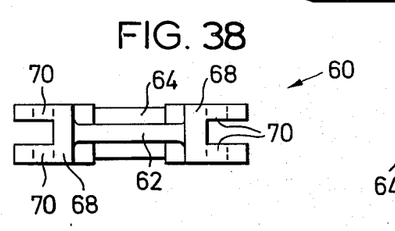
FIG. 38 is a front elevation of a third form of chain link according to the invention.
Figure 39:
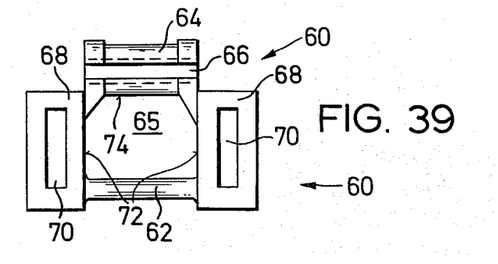
FIG. 39 is a plan view of FIG. 38.
Figure 40:
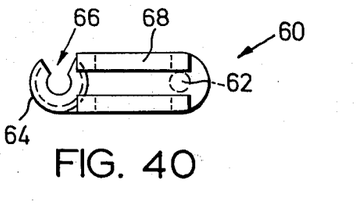
FIG. 40 is a side elevation of the third form of chain link shown in FIGS. 38 and 39.

The drawings show three different forms of chain link according to the invention, viz. a first form shown in FIGS. 1–18, a second form shown in FIGS. 19–35, and a third form shown in FIGS. 38–40.

Figure 1:
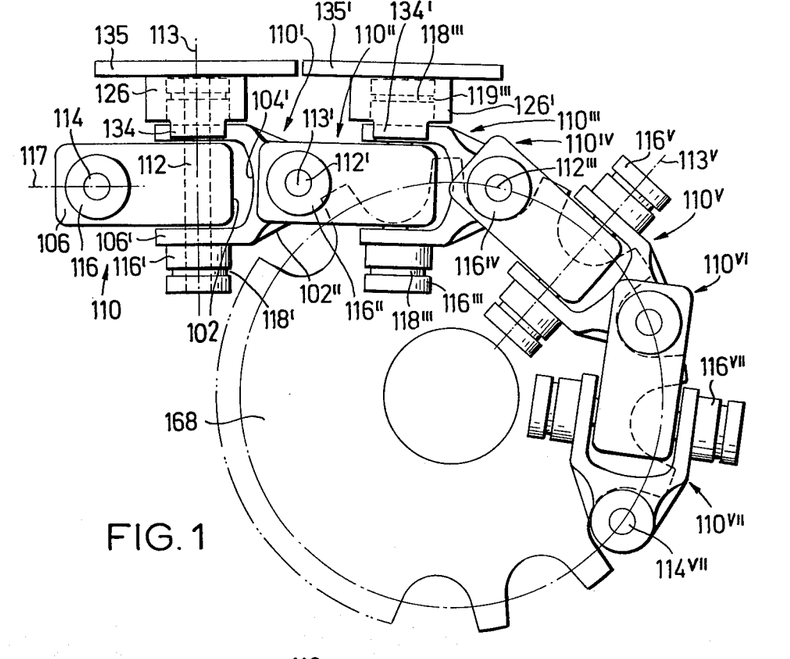
FIG. 1 is a side elevation of a chain composed of links according to the invention, some links being shown guided round a sprocket wheel and some links having supplementary parts attached to them.
Figure 2:
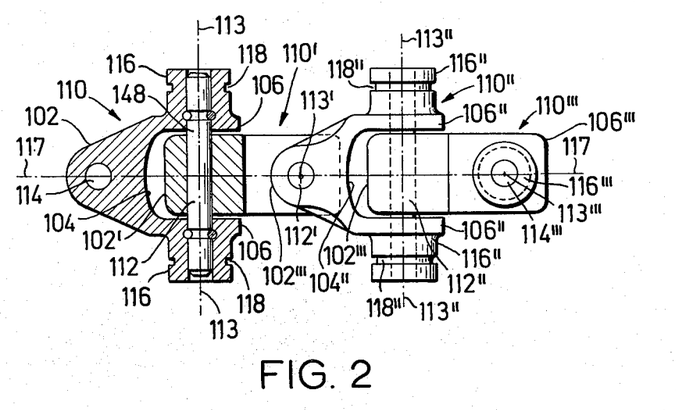
FIG. 2 is a sectional view through four serially connected links according to the invention, of which two are disposed with their main plane in the plane of the drawing and two have their main plane perpendicular to the plane of the drawing.

The link 110 shown in FIGS. 1–18, as can be seen particularly well from FIGS. 1 and 2, has a substantially U-shape, with two parallel arms 106 and a crosspiece 104 connecting these arms 106. Provided near the free end of each arm 106 is a hub 114 which receives a swivel axle 112 and which is in alignment with the hub 114 of the second arm 106. There is also a third hub 114 formed in an arm 102 disposed in the middle of the crosspiece 104 at right-angles to the latter. The arm 102 is formed integrally with the crosspiece 104 and the arms 106, which gives a forked shape to the link 110.

All the hubs 114 of each link 110 are closed in annular form.

A boss 116 is provided on the outer side of each arm 106 and is in the form of a circular cylinder having a hub bore in its center which is in alignment with the hub 144 formed in the arm 106 as well as with the hub 114 formed in the other arm 106 and the hub bore provided in the boss 116 disposed on the other arm 106. Each link 110 thus has two outwardly directed bosses 116.

The axis 113 of the third hub 114 of the link 110 forms an angle of 90° with the axis 113 of the two hubs 114 in the arms 106 of the link 110. The axes 113 of all the hubs 114 of the link 110 intersect the main longitudinal axis 117 of the link 110.

Figure 13:
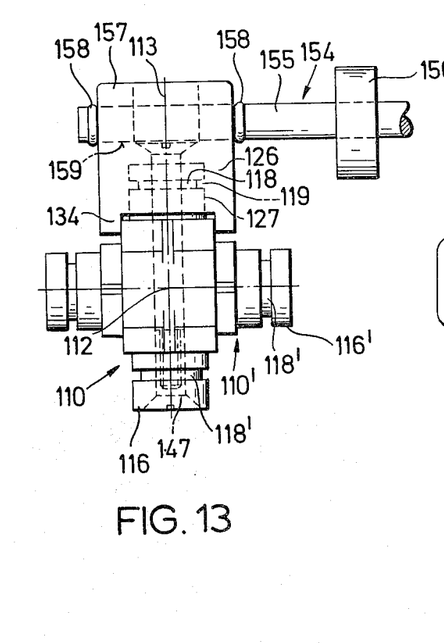
FIG. 13 is a sectional front elevation showing the manner of fastening a bar or an axle to a chain link according to the invention.
Figure 14:
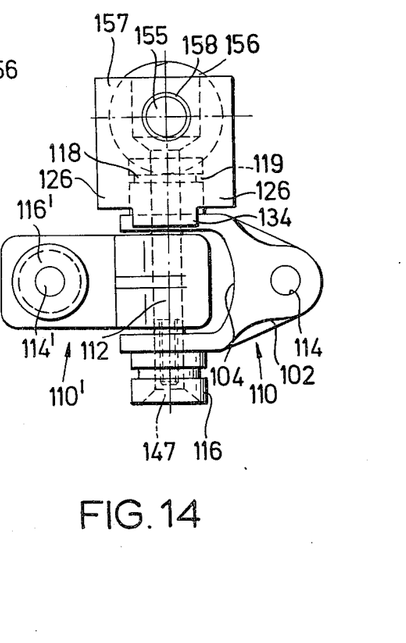
FIG. 14 is a side elevation of FIG. 13.
Figure 15:
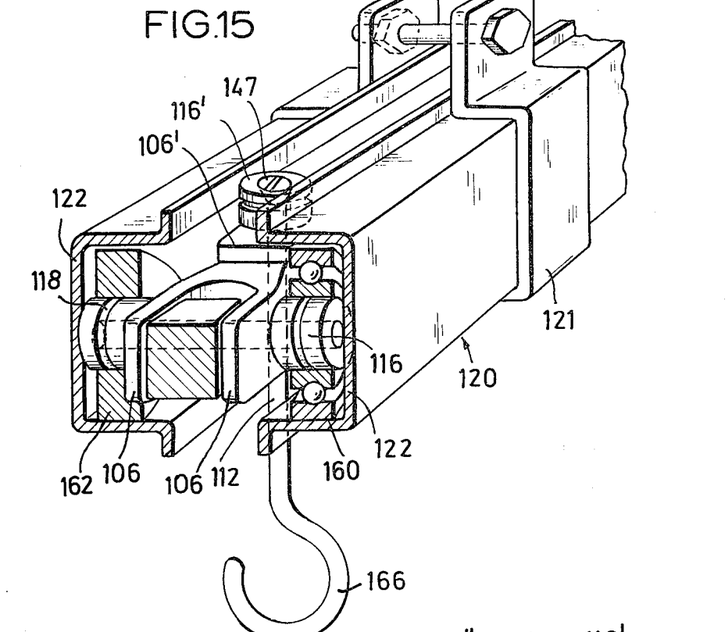
FIG. 15 is a perspective, partly sectional view of part of a guide track in which chain links according to the invention are guided by means of bearing rollers.

To join together a number of links as described to form a chain, the arm 102' of the link 110' following a first link 110 is inserted between the arms 106 of the link 110 until the hub 114 formed in the arm 102' is in alignment with the hubs 114 formed in the arms 106. An element acting as a swivel axle 112 is then inserted in the aligned hubs 114, which element may be, for example, a drop-in pin 148 retained in the hub bores by means of locking elements, as shown in FIGS. 2, 3, 6 and 8, a fastening bolt 147, as shown in FIGS. 10 to 14, or a fastening hook 116, as shown in FIG. 15.

Figure 3:
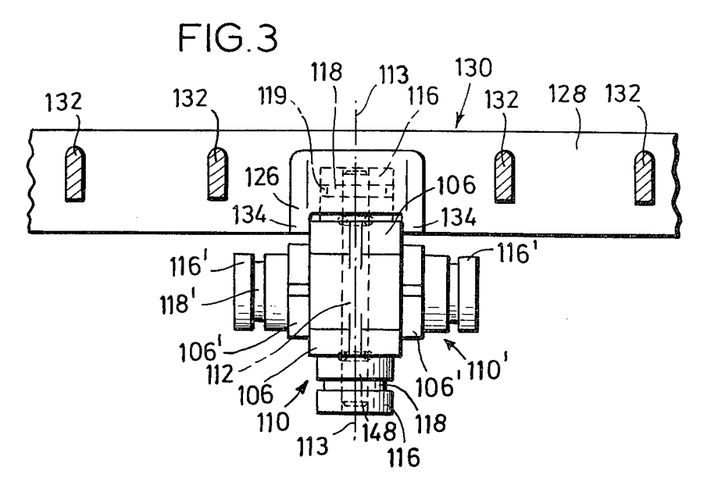
FIG. 3 is a partly perspective, partly sectional, and partly cutaway front view showing two links according to the invention one behind the other perpendicular to the plane of the drawing and a cross bar fitted to one of the links.
Figure 4:
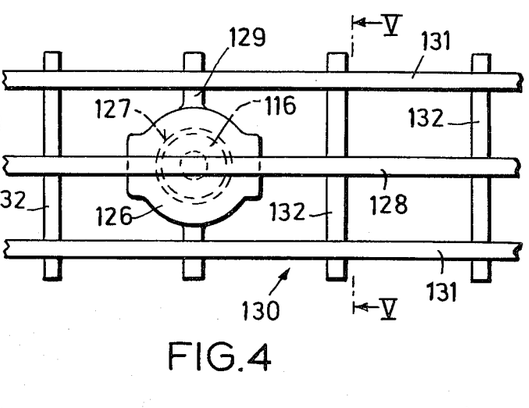
FIG. 4 is a partly cutaway plan view of FIG. 3 showing further cross bars and longitudinal bars of a lattice plate.
Figure 5:
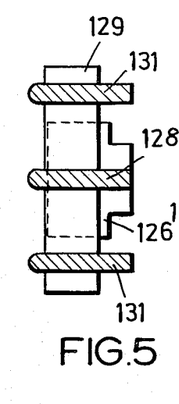
FIG. 5 is a sectional view along line V—V of FIG. 4.
Figure 10:
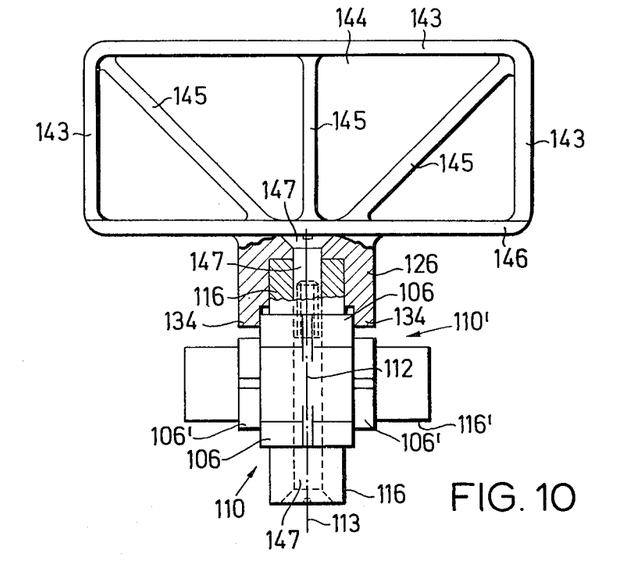
FIG. 10 is a sectional front elevation of a driving plate fitted to a chain link according to the invention.
Figure 11:
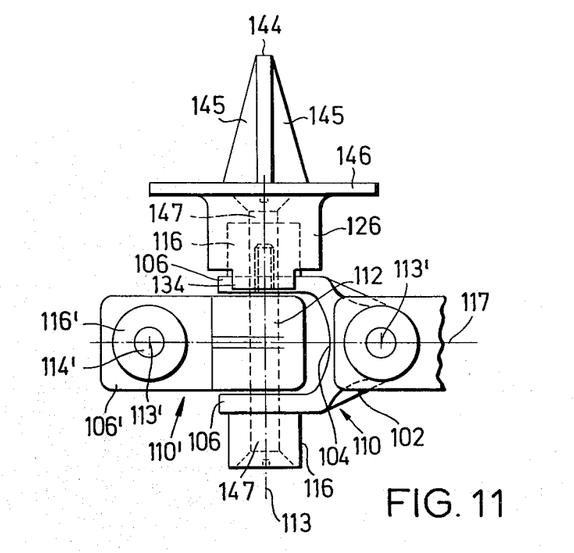
FIG. 11 is a sectional side elevation of FIG. 10.
Figure 12:
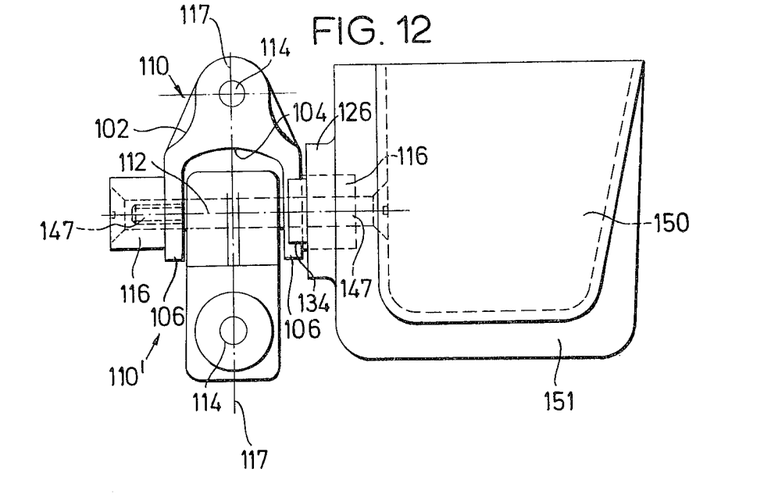
FIG. 12 is a sectional side elevation of a bucket fitted to a link according to the invention.
Figure 16:
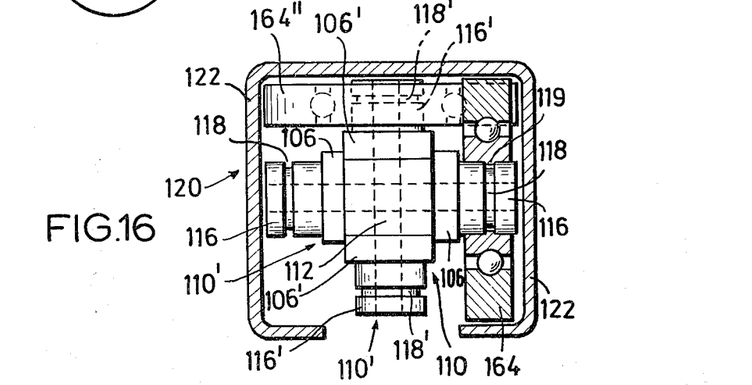
FIG. 16 is a view similar to FIG. 15, but showing roller bearings offset at right-angles to one another.
Figure 17:
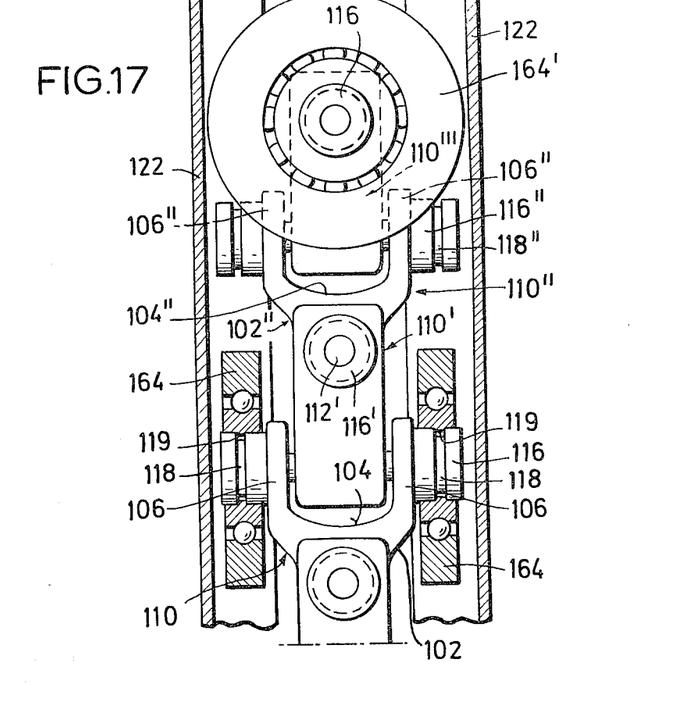
FIG. 17 is a sectional plan view of FIG. 16.
Figure 18:
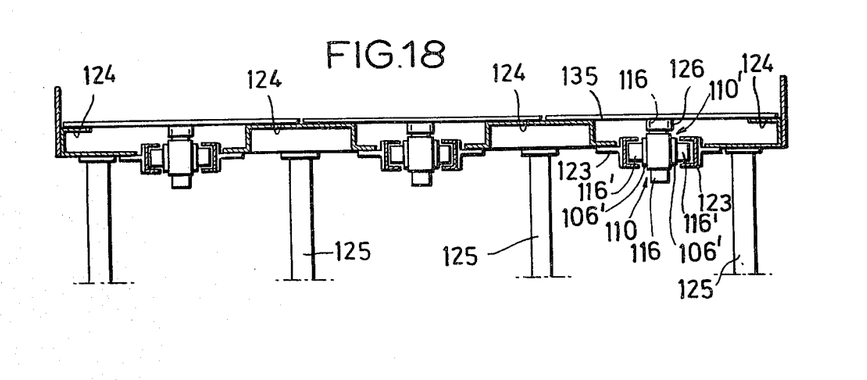
FIG. 18 is a sectional front view of a chain conveyor with three conveyor chains disposed side by side and each made up of links according to the invention, each chain being fitted with plates.

When links as described above are assembled to form a chain the bosses 116 on successive links 110 are offset by 90° respectively. Accordingly, in the chain shown in FIG. 1, looking from left to right, the bosses 116 of the first link 110, the bosses 116'' of the third link, the bosses 116'''' of the fifth link, etc., are disposed perpendicularly to the plane of the drawing, whereas the bosses 116' of the second link, the bosses 116''' of the fourth link, the bosses 116''''' of the sixth link and the bosses 116''''''' of the eighth link lie with their axes in the plane of the drawing. This alternating orientation of the bosses 116 makes it possible to utilize the bosses 116 in many different ways. In an assembled chain a group of bosses 116 which are all similarly orientated acts as engaging elements for sprocket wheels 168, as shown in FIG. 1. At the same time the second group of bosses 116, which are orientated at right angles to the bosses 116 of the first group, act as fastening elements for supplementary parts, for example for lattice plates 130, as shown in FIGS. 3 to 5, for solid platforms 135 as shown in FIGS. 1, 6–9 and 18, for driving plates 144, as shown in FIGS. 10 and 11, for buckets 150 as shown in FIG. 12, or for a bar holder 154 carrying a roller mounted on an axle 155, as is shown in FIGS. 13 and 14. It is also possible, however, to employ the bosses 116 as guiding elements which are guided in guide rails 120, as shown in FIGS. 15 to 17, or guide rails 123, as shown in FIG. 18. In this case the bosses 116 may also simultaneously act as journal pins for bearings rollers 160 or 162 which are disposed in appropriately formed channels 122 of guide rails 10, as shown in FIGS. 15 to 17.

A chain composed of the above-described links 110 has, moreover, an unusual mobility. This means that it can follow any curved path, irrespective of the angle at which the curved path leads away from the main longitudinal axis of the chain. Thus, it is ideally suited for application as a loop conveyor which follows an endless circular path, or a path passing through differences in level. This three-dimensional mobility is achieved since successive swivel axles 112, 112' form an angle of 90° with one another and similarly the main planes of successive links 110, 110' also form an angle of 90° with one another. Consequently every other swivel axle ensures that the links can swivel in a plane containing the main longitudinal axis of the chain, while all the intermediate swivel axles permit swivelling in the plane perpendicular thereto and also containing the main longitudinal axis. An application of this kind can be seen, for example, in the arrangement shown in FIG. 1 if it is assumed that in the plane leading towards the sprocket wheel 168 a segment of circle is passed through. With a conveyor of this type it is possible to traverse conveying paths including curves or even almost closed loops, while at the same time the conveyor is guided round the sprocket wheel 168, downwards and under the conveyor track by the shortest path back to the start.

It is possible in a simple manner to fit a multiplicity of supplementary parts to the individual links of an assembled chain. To this end each supplementary part 130, 135, 144, 150, 154, 160, 162, 164, 166 has at least one fastening head 126 including a bore 127 in which a boss 116 of a link 110 can be received substantially positively. Each fastening head 126 has, furthermore, in the region of the open end of its bore 127 two stop lugs 134 situated opposite one another and projecting axially from the bore 127. These stop lugs 134 serve, after a boss 116 has been received, to connect the fastening head 126 in a rotationally fixed manner to the arm 106 associated with the boss 116. This is brought about in the following way. As the fastening head 126 is fitted by its bore 127 on a boss 116, the fastening head 126 is rotated so that the stop lugs 134 are orientated parallel to the lateral faces of the associated arm 106. The boss 116 is then pushed deeper into the bore 127 of the fastening head 126 while the stop lugs 134 slide past the lateral faces of the associated arm 106.

There are many possibilities for interconnecting a boss 116 of a link 110 and the fastening head 126 of a supplementary part which is pushed on to it. It can be effected, for example, by means of a drop-in pin which is introduced through a retaining bore in the fastening head 126 and through the aligned hub bores 114 of the two oppositely directed bosses 116. Such a drop-in pin acts simultaneously as a swivel axle 112 between two interconnected links 110 while it holds the supplementary part in place by means of a widened head making contact in the retaining bore of the fastening head 126.

If the supplementary part, for example as a driving plate 144 a conveyor bucket 150 or a bar holder 154, has to absorb forces which tend to pull the supplementary part with its fastening head away from the pin element of the link, it is better to employ fastening bolts 147 instead of drop-in pins.

In every case where the supplementary parts only absorb forces tending to force the supplementary parts with their fastening head even more firmly on to the bosses 116 of the link, it is advantageous to use separate elements for the articulated connection of successive links to one another and for the retaining of the supplementary parts in position on the links, since then the assembly of the individual links can be carried out so as to obtain a desired conveyor chain on the one hand, independently of the fitting, removal, or changing of supplementary parts.

For this reason in the arrangements shown in FIGS. 1 to 9 a drop-in pin 148 is provided, the sole function of which is to provide the articulated interconnection of successive links 110. To this end the drop-in pin 148 may be constructed with locking grooves or locking ribs at one or both ends which engage with associated locking ribs or locking grooves, respectively, formed in the hub bores. The drop-in pins 148 are used independently of the supplementary parts.

Furthermore, each boss 116 has an annular locking groove 118, while in the bore 127 of each fastening head 126 there are provided individual locking ribs 119 or a locking ring which, when the fastening head 126 is spaced on a boss 116, spring into engagement with its annular locking grooves 118.

As shown in FIGS. 3 to 5, a lattice plate 130 can be provided as a supplementary part which, in the illustrated form, comprises three cross bars, namely a middle cross bar 128 and two outer cross bars 131, and a series of longitudinally extending bars, namely a middle longitudinal bar 129 and longitudinal bars 132 parallel therewith. In this arrangement the middle cross bar 128 and the middle longitudinal bar 129 are rigidly connected to a common fastening head 126. The longitudinal bars 129 and 132 are of a lesser height than the cross bars 128 and 131, and are positively accommodated in receiving slots in the cross bars so that a rigid lattice structure is built up.

Figure 6:
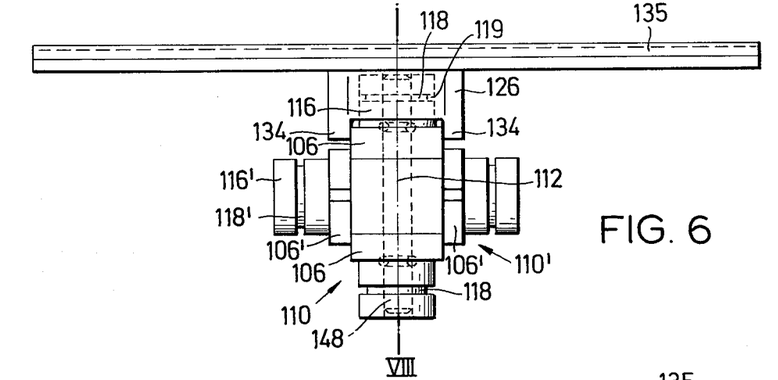
FIG. 6 is a view similar to FIG. 3 in which, instead of a cross bar, a solid plate is fitted to one of the links.
Figure 7:
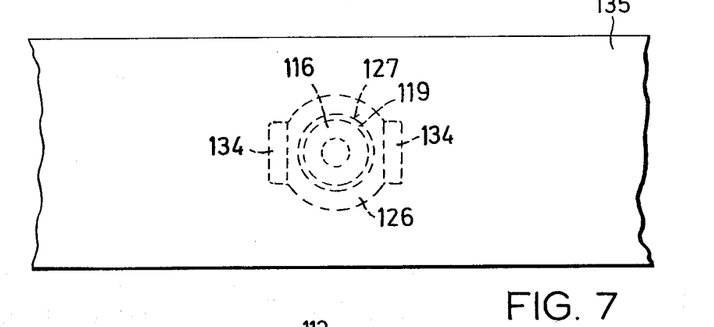
FIG. 7 is a partly cutaway plan view of FIG. 6.
Figure 8:
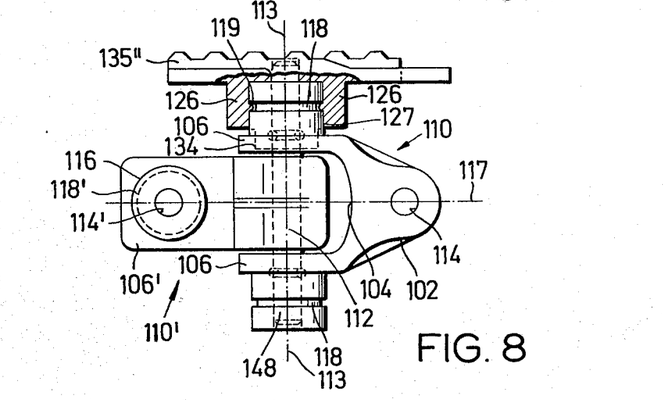
FIG. 8 is a sectional view along the line VIII—VIII in FIG. 6 in which the solid plate is illustrated with a corrugated surface.
Figure 9:
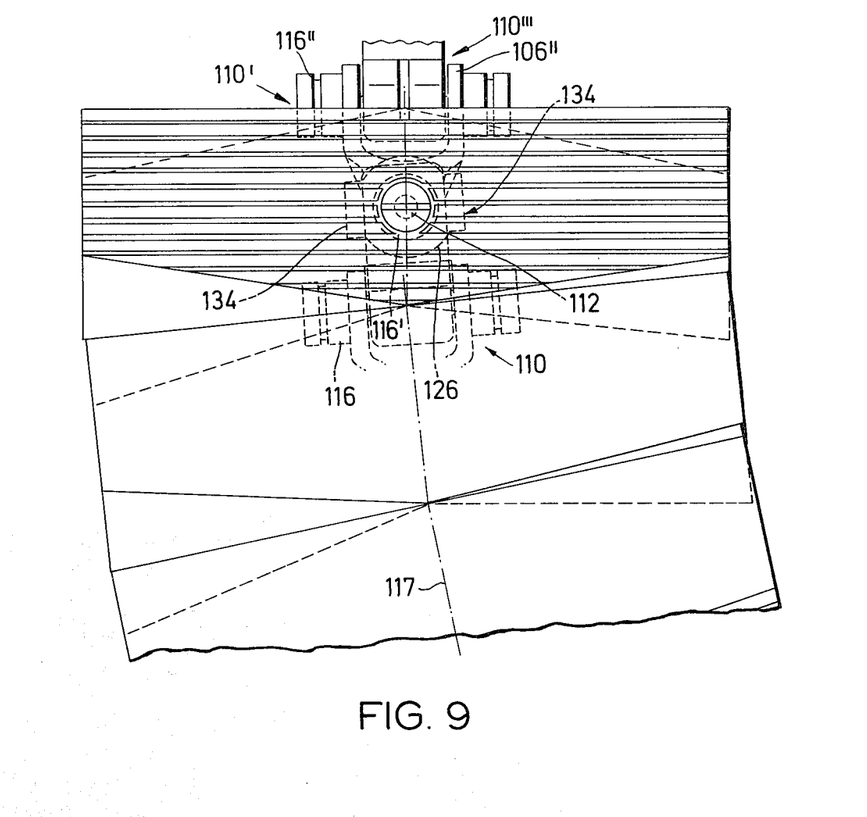
FIG. 9 is a partly cutaway plan view of a part of a chain conveyor having conveyor plates carried by chain links according to the invention, part of a curved guide being represented in which the plates overlap.

In FIGS. 6 to 9 solid plates 135 are shown as supplementary parts. Each plate 135 is provided with a fastening head 126 at its centre of gravity. Here the plates 135 may have a smooth surface, as shown in FIGS. 6 and 7, or a fluted surface as shown in FIG. 8. In the arrangement shown in FIG. 9, the conveyor chain is passing through an arc of a circle. For this it is necessary either for the plates 135 to be disposed at different levels, so that they can overlap partially, or for the plates 135 to be adequately tapered at both ends.

As can be seen from FIGS. 10 and 11 it is also possible to mount a driving plate 144 on a link 110 as the supplementary part. The drawing shows such a driving plate 144 comprising a base plate 146 disposed at right-angles to the driving surfaces, to which base plate 146 the fastening head 126 is connected. The actual driving surfaces are formed by ribs 145 which support edge strips 143 which, together with the base plate 146, form a closed frame.

According to FIG. 12, conveyor buckets 150 are provided as supplementary parts. Each conveyor bucket 150 has a U-shaped rib 151 to the side of which is attached a fastening head 126 with which the conveyor bucket 150 can be fitted on to a link 110.

FIGS. 13 and 14 represent a bar holder 154 comprising a carrier head 157 which also constitutes the fastening head and which has a bar bore 159 which extends above the receiving bore 127 ar right-angles to the latter. An axle 155 is inserted in the bar bore 159 and connected rigidly in the axial direction with the carrier head 157 by means of retaining rings 158. There is also a roller 156 on the axle 155. A plurality of such rollers may be disposed side by side on the axle 155 for conveying purposes.

In the arrangement shown in FIGS. 15 to 17 a chain made up of the links 110 constitutes a hanger transport chain which is guided along any desired path. To this end bearing rollers are provided on the pin elements 116. In the right-hand part of FIG. 15 the bearing roller is represented as a ball bearing roller 160 and in the left-hand part as a sliding bearing roller 162. These bearing rollers 160 or 162 are guided in channels 122 of a guide rail 120. The guide rail 120 has ceiling attachment elements 121 by which it can be rigidly fixed to any desired point.

In this connection, according to FIG. 15, the links are connected with one another at intervals by means of fastening hooks 166 which act simultaneously as swivel axles 112 and take the form of a hook at the downwardly projecting end.

When, with a hanger chain of this kind, it is necessary to guide it very precisely it is possible to employ bearing rollers 164 orientated at right-angles to one another and disposed in pairs on opposite sides of the chain, the lines connecting successive pairs of bearing rollers forming an angle of 90° with one another.

As shown in FIG. 18 it is possible for a plurality of conveyor chains to be used simultaneously, side by side, the horizontally directed pin elements being guided in guide rails 123, and supplementary parts being fitted on to the vertically upward directed bosses 116. In the arrangement shown these supplementary parts are plates 135, all the plates being supported in the region of their outer ends by supporting rails 124. In this way a very wide, level conveying surface is formed. The supporting rails 125 and the guide rails 123 are carried by means of bearers 125.

Referring now to FIGS. 19 to 37, the links 10 here shown comprise of two parallel cheeks 11 which are connected to one another at one end by a swivel axle 12, formed integrally with the cheeks 11, and at the other end by a hub 14 which is likewise formed integrally. The individual links 10 can be produced with all their parts, to be described subsequently, from plastics material in a single forming process, eg. by injection moulding.

Figures 20, 21, 22, 23:
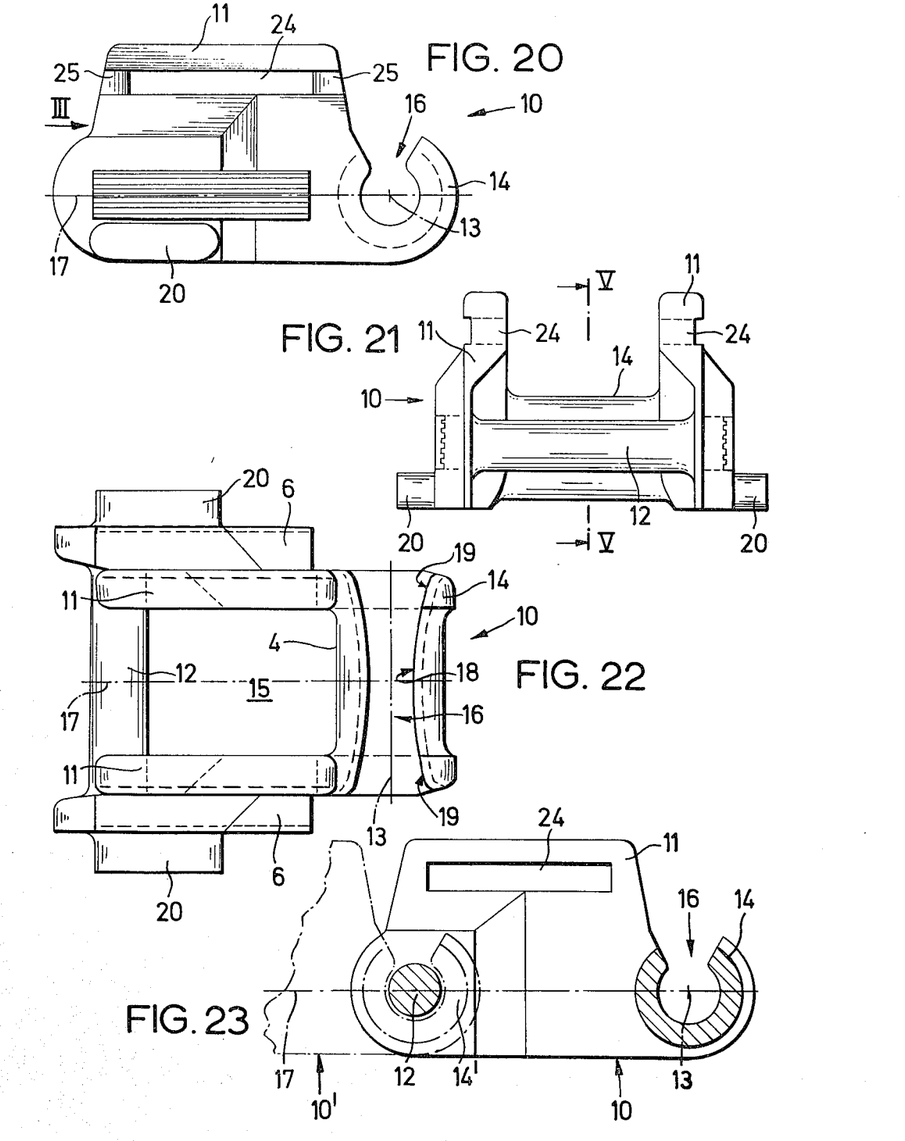
FIG. 20 is a side elevation of a chain link as shown in FIG. 19.
FIG. 21 is a front elevation in the direction of the arrow III in FIG. 20.
FIG. 22 is a plan view of FIG. 20.
FIG. 23 is a section along the line V—V in FIG. 21.

Between the cheeks 11, the swivel axle 12 and the hub 14 an engaging hole 15 (FIG. 22) is provided, for the teeth of sprocket wheels — not shown — which carry and drive the chain. The hub 14 has an axially parallel opening 16 which at its narrowest part is slightly narrower than the diameter of the swivel axle 12 so that, owing to the elastic deformability of the plastics material, the swivel axle 12 of a link 10 only has to snap into the hub 14' of the following link 10', as illustrated in FIG. 23, to form a chain. When required, it is similarly possible to detach the individual links from one another again by snapping them out.

If, as shown in FIG. 22, the bore of the hub 14 is designed convexly so that in the middle 18 it is substantially equal in diameter to the swivel axle 12 and widens out towards the two ends 19, the individual links can not only execute an articulated movement round the joint between the swivel axle and the hub, but can also make a swivelling movement transversely to this joint because the swivel axle 12 possesses a certain capacity for lateral swing in the hub 14. This is made particularly clear in FIG. 30 which shows how, with a chain composed of links 10, lateral curves in the plane of the chain are possible if the supplementary parts which are attached are appropriately designed for this.

Figure 27:
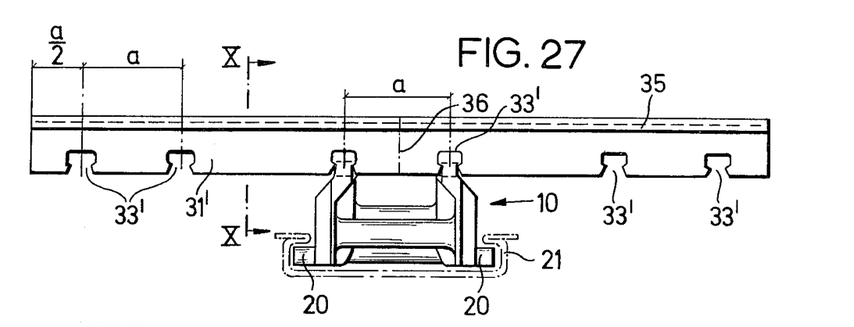
FIG. 27 is a view corresponding to FIG. 24 but with a fluted plate supplementary part.

For additional guiding of the chain a laterally projecting guide element is provided on the outer side of each cheek 11 of the link 10 to act as a guide vane 20 by means of which the link 10 is guided, as shown by the dash-dot lines in FIG. 27, in associated guide rails 21 which are rigidly mounted. It would be enough, for this purpose, to provide on each side of the chain a single U-section receiving the guide vanes 20, as a guide rail.

An important feature of the links 10 is the design of the receiving slot for the attachment of supplementary parts. These receiving slots 24 are formed in alignment with one another as continuous slots in the upper portion of the cheeks 11, and if necessary may be arranged so as to continue at both ends by short grooves 25 which provide additional support and possibly may facilitate the fastening of the supplementary parts to the links 10.

Figure 24:
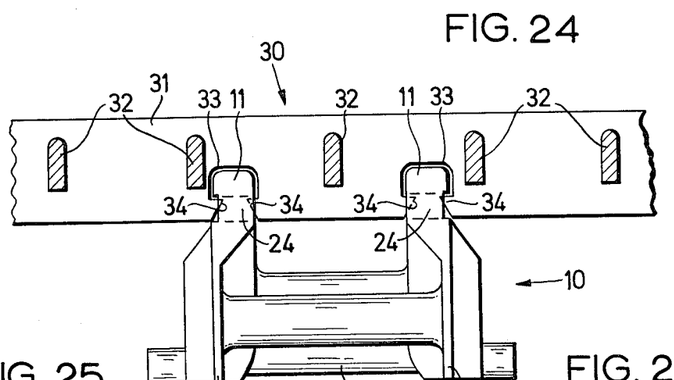
FIG. 24 is a cross section of a chain link shown in FIG. 19 with a lattice plate supplementary part attached thereto.
Figure 25:
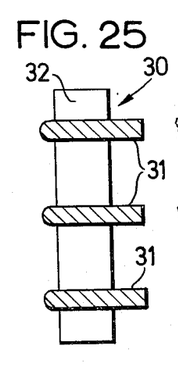
FIGS. 25 and 26 are a cross section and plan, respectively, of the lattice plate supplementary part shown in FIG. 24.
Figure 26:
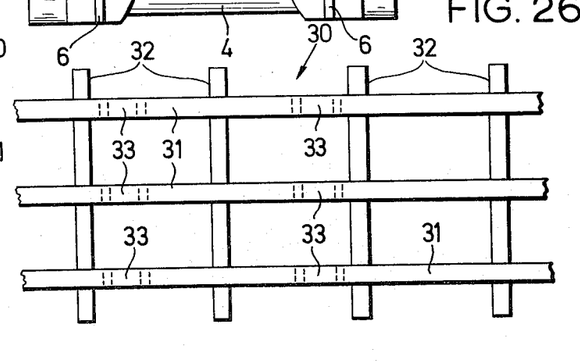

A basic chain composed of such links 10 can be modified for any required application by the attachment of appropriate supplementary parts. If, for example, piece goods are to be carried on the chain conveyor, lattice plates 30 are fitted to the individual links, as shown in FIGS. 24 to 26. The lattice plate 30 shown consist of three cross bars 31 and a larger number of longitudinal bars 32 which are formed in one piece and likewise consist of plastics material, and the cross bars 31 extend beyond the longitudinal bars 32 above and below. Formed in the under side of the cross bars 31 at the distance of the cheeks 11 of the links 10 are recesses 33 which, be means of corresponding projections 34, are undercut in such a way that these recesses 33 can be pushed on to the upper sides of the cheeks 11 of the individual links 10 and thus the projections 34 which constitute catches drop into the slots 24 in the cheeks 11. In this way a firm seating is obtained for the lattice plate 30 on the associated link 10 which can nevertheless be released when necessary. When one of these lattice plates 30 is mounted on each link 10, the completed chain conveyor constitutes a lattice belt on which cartons or other goods can be conveyed.

In FIG. 27 the recesses 33' are disposed in pairs at the distance of the cheeks 11 of the individual links 10 in the cross bars 31' in such a way that the last recess 33 at each end of the cross cars 31 is at a distance $a/2$ from the end of this cross bar 31', the distance between the cheeks 11 of an individual link 10 being $a$. In this construction two supplementary parts may meet over one link 10, as indicated by the dash-dot line in FIG. 27, if a particularly wide conveying surface is wanted. It is possible, furthermore, to dispose a plurality of basic chains formed from the links 10 side by side, the cheeks 11 of their links 10 engaging in the recesses 33' of the supplementary parts, so as the form conveyor chains of any desired width.

Figures 28, 29, 30, 32:
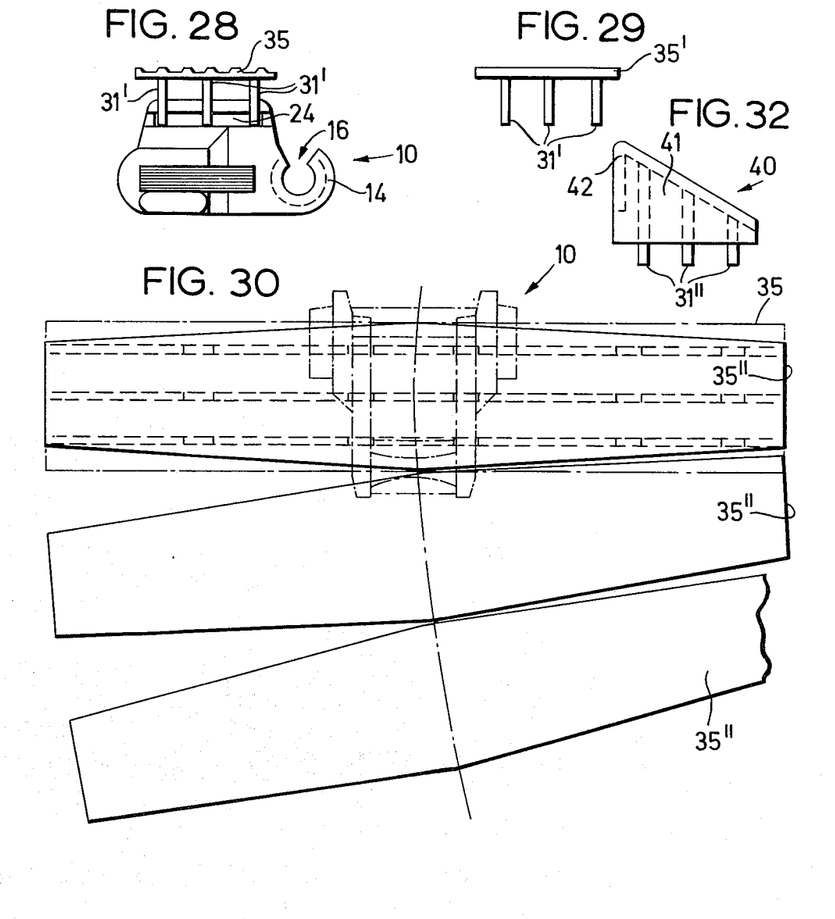
FIG. 28 is a section along the line X—X in FIG. 27.
FIG. 29 shows a plate supplementary part in side elevation.
FIG. 30 is a plan view of part of a conveyor having a chain made up of links as shown in FIG. 19.
FIG. 32 is a diagrammatic side elevation of a driving supplementary part.

FIGS. 27 and 28 show an arrangement in which the lattice plate 30 shown in FIG. 24 carrier a plate 35, fluted on its top side, over the cross bars 31' thus forming a conveying surface on which goods to be moved are placed. As shown in FIG. 29 this plate 35' may otherwise be a smooth plate.

The plates 35, 35' shown in FIGS. 27 to 29 may have a rectangular shape in plan view, as shown at 35 in FIG. 30. However, if the chain conveyor has to traverse curves to the right and/or left, not only must the hub 14 of the links 10 be of convex construction, in the above-described manner, but the plates constituting the conveying surface must also either be capable of overlapping on traversing a curve, or be tapered laterally, as illustrated in FIG. 30 on the plates 35".

Figure 31:
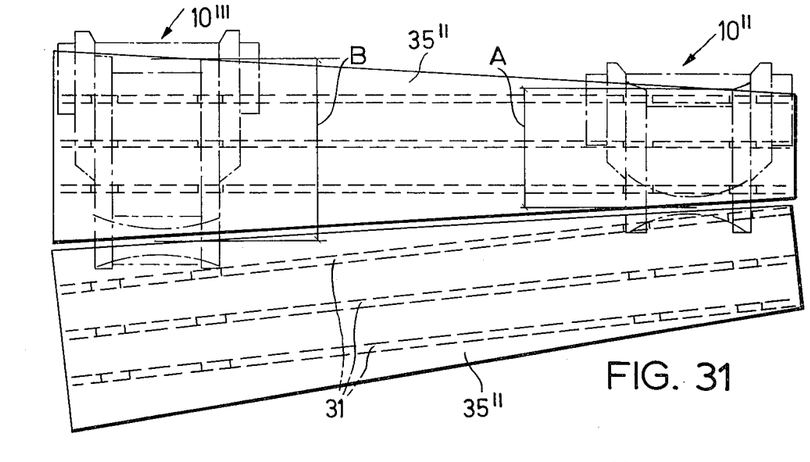
FIG. 31 is a plan view of another conveyor having two chains made up of links according to the invention.

As shown in FIG. 31, it is also possible, for the purpose of traversing a lateral curve, to disposed two or more basic chains as curve chains, which is advisable or necessary in the case of particularly wide and/or particularly heavily loaded conveyor chains. When a number of basic chains side by side in the curve region form the conveyor chain, the individual links 10", 10''' are necessarily of different lengths A,B, because of the different length of arc traversed by them. In other respects the basic conception of the curve chain represented in FIG. 31 does not differ from the previously described constructions, i.e. the supplementary parts are fastened to the links 10", 10''' with cross bars 31, the supplementary parts having trapezoidal plates 35'. The higher cost of production of links 10", 10''' of different lengths and the trapezoidal supplementary parts for traversing a curve is overcome by the advantage that even in the region of the curve the conveying surface formed by the conveyor chain does not gap open, as is the case on the outer side with an arrangement as shown in FIG. 30.

Figure 19:
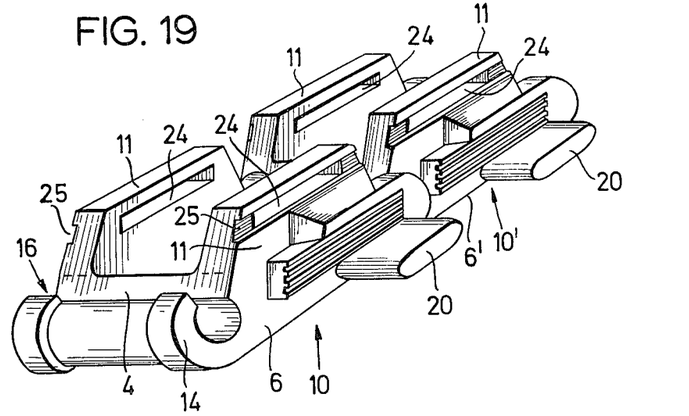
FIG. 19 is a perspective view of two chains links of a second form according to the invention.

FIG. 32 shows a driving plate 40 for attachment to a basic chain of the type shown in FIG. 19. This driving plate 40 has cross bars 31" which, as with the cross bars 31 in FIG. 24, are fastened by means of recesses 33 on the cheeks 11 of the chain links 10. Angle plates 42 are formed on the driving plates 40 with trapezoidal longitudinal bars 41. Driving plates 40 of this type, which are vertical on the front side and sloping at the back, are used for conveying bulk goods, for example shavings, with a reciprocating conveyor chain in the forward movement of which the bulk goods are pushed forward by the vertical front of the driving plate 40 and in the backward movement of which the driving plate 40 slides under the bulk goods owing to its sloping rear side.

Figure 33:
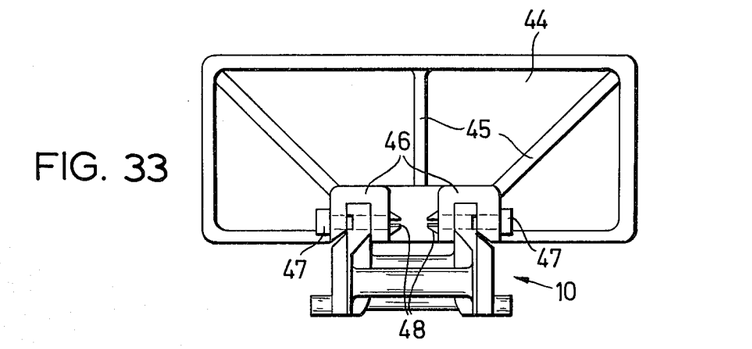
FIG. 33 is a front elevation of another driving supplementary part.
Figure 34:
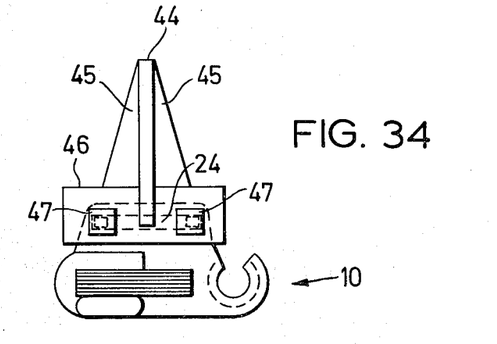
FIG. 34 is a side elevation of FIG. 33.

Another form of driving plate 44 is shown in FIGS. 33 and 34; this is reinforced by ribs 45 and has U-shaped fastening elements 46 which are disposed at the distance of the cheeks 11 of the link 10 and are attached to the link 10 with fastening bolts 47 which are pushed through the receiving slot 24 of the cheeks 11 and the inner end 48 of which carries elastically deformable barbs. The driving plate 44 shown upright in FIGS. 33 and 34 is used, for example, for pushing forward cartons or other single items. The use of fastening bolts 47 is convenient in this case because the U-shaped fastening elements 46 may possibly not be sufficiently elastically deformable to permit snapping in to the tip sides of the cheeks 11 of the links 10. The use of these fastening bolts 47 is possible because the receiving slots 24 pass right through the cheeks 11. The fastening bolts 47 produce a very strong connection between the supplementary part and the link 10, and therefore, the use of fastening bolts 47 is always recommended when a heavy load is imposed on the supplementary part.

Figures 35, 36, 37:
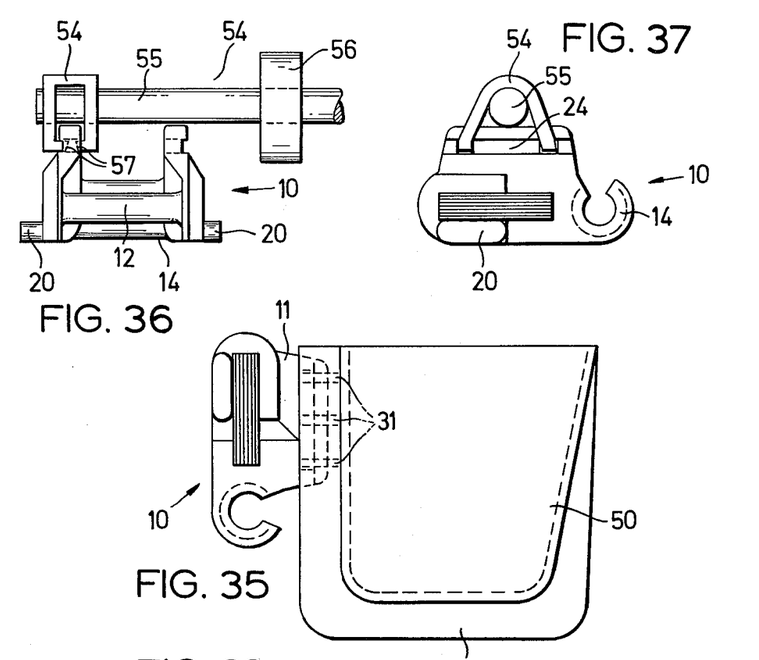
FIG. 35 is a side elevation of a bucket supplementary part.
FIG. 36 is a front elevation showing the manner of fastening a bar or an axle to a chain link as shown in FIG. 19.
FIG. 37 is a side elevation of FIG. 36.

FIG. 35 shows a conveyor bucket 50 with which, together with the conveyor chain, it is possible to build up a bucket conveyor. The bucket itself has U-shaped stiffening ribs 51, and cross bars 31 provided with recesses 33 for attachment to the cheeks 11 of the links 10. If the operational load on the buckets 50 is very great it is also possible for each bucket 50 to be fastened by means of a fastening bolt 47, as shown in FIGS. 33 and 34.

As shown in FIGS. 36 and 37 bars or axles which run transversely can also be fixed on to a basic chain made up of links as shown in FIG. 19. A bar holder 54 is used for this purpose, which has a U-shape in side elevation (FIG. 37) and in the front elevation (FIG. 36) a C-shape, the four ends 57 thus formed encircling an axle or a bar 55 engaging elastically in the receiving slot 24 of a link 10. In the arrangement shown in FIGS. 36 and 37 the axle 55 fastened in this way carries a roller 56 at the side of the conveyor chain.

Referring now to FIGS. 38 to 40, these show a link 60 comprising an axle 62 and a hub 64 connected by two lateral cheeks 68, the hub 64 having an opening 66 corresponding to the opening 16 of the link of FIGS. 19 to 37. The swivel axle 62, the hub 64 and the cheeks 68 form an engaging hole 65 for the teeth of sprocket wheels. In contradistinction to the form of link shown in FIG. 19, the slots 70 in the cheeks 68 are so designed at the sides as to lie in planes parallel to one another which are disposed at right-angles to the plane containing the hub 64 and the swivel axle 62. The supplementary parts for this link must be constructed correspondingly. The U-shape of this form results from the cheeks 68 forming the arms 72 and the hub 64 forming the crosspiece 74.

What is claimed is:

1. A link to be assembled to other similar links to form a chain capable of movement in three mutually perpendicular directions comprising a plastic material member of generally U-shaped configuration including a cross piece and two opposed arms, a first hub formed unitary with said cross piece and having a bore therein for receiving a first swivel axle means for pivotally securing said link to a second link, a pair of hubs respectively formed unitary with said opposed arms and having aligned bores therein for receiving a second swivel axle means for pivotally securing said link to a third link, with the longitudinal axis of said first swivel axle means being perpendicular to the longitudinal axis of said second swivel axle means, and wherein each of said pair of hubs constitutes means for attachment of supplementary parts.

2. A link as claimed in claim 1 in which each of said pair of hubs has an annular groove on its outer surface.

3. A link as claimed in claim 2 further including a supplementary part having a fastening head including a bore in which one of said pair of hubs of said link is received.

4. A link as claimed in claim 3 in which said bore in said fastening head of said supplementary part has a locking ring therein, which ring engages in said annular groove in said hub.

5. A link as claimed in claim 3 in which fastening head carries two lugs positioned one each side of the arm of said member carrying said one of said pair of hubs thereby preventing said fastening head from rotating relative to said arm.

6. A link as claimed in claim 3 in which said fastening head is secured to said one of said pair of hubs by means of a pin which passes through a retaining bore in said fastening head and through the bores in both said pair of hubs, said pin thereby also constituting said second swivel axle means.

7. A link as claimed in claim 6 in which said pin is constituted by a bolt having a nut screwed thereon to retain the bolt in position.

8. A link as claimed in claim 3 in which said supplementary part is a lattice plate.

9. A link as claimed in claim 3 in which said supplementary part is a solid plate having a smooth surface.

10. A link as claimed in claim 3 in which said supplementary part is a solid plate having a corrugated surface.

11. A link as claimed in claim 3 in which said supplementary part is a driving plate.

12. A link as claimed in claim 3 in which said supplementary part is a bucket.

13. A link as claimed in claim 3 in which said supplementary part is a bar and associated holders.

14. A link as claimed in claim 1 in which said pair of hubs of alternate links carry roller bearings arranged to engage in channels of a guide rail.

15. A link as claimed in claim 1 in which one of said pair of hubs of each of the other links carries a roller bearings arranged to engage surfaces of said guide rail perpendicular to the surface thereof engaged by the roller bearing on said alternate links.

16. A link as claimed in claim 14 in which each of said pair of hubs has an annular groove on its outer surface, and wherein said bearings have ribs which engage in said annular grooves.

17. A link as claimed in claim 14 in which each of the first swivel axle means of said alternate links extend at one end beyond the hub and is formed as a hook.

* * * * *